United States Patent [19]

Kubo et al.

[11] Patent Number: 4,525,548
[45] Date of Patent: Jun. 25, 1985

[54] METHOD FOR VAPOR PHASE POLYMERIZATION OF OLEFINS

[75] Inventors: Kunimichi Kubo, Tokyo; Mamoru Yoshikawa; Motokazu Watanabe, both of Kawasaki; Yasunosuke Miyazaki, Machida; Mituji Miyoshi, Kanagawa, all of Japan

[73] Assignee: Nippon Oil Company Limited, Nishi, Japan

[21] Appl. No.: 406,435

[22] Filed: Aug. 9, 1982

Related U.S. Application Data

[62] Division of Ser. No. 242,308, Mar. 10, 1981, Pat. No. 4,372,919.

[51] Int. Cl.$^3$ ............................................. C08F 2/34
[52] U.S. Cl. ............................................. 526/72; 526/88
[58] Field of Search ............... 34/57 D; 422/131, 135, 422/137, 143, 311; 264/122; 526/72, 88

[56] References Cited

U.S. PATENT DOCUMENTS 3,999,951  12/1976  Bowers et al. .................. 23/277
4,101,289  7/1978   Jezl ............................. 23/288
4,159,307  6/1979   Shigeyasu et al. ............. 422/215
4,200,715  4/1980   Lynch .......................... 526/88

FOREIGN PATENT DOCUMENTS 1267397  3/1972  United Kingdom .

Primary Examiner—Paul R. Michl
Attorney, Agent, or Firm—Austin R. Miller

[57] ABSTRACT

Provided is a method for vapor phase polymerization of olefins. An olefin gas is fed into a horizontal cylindrical vessel having a lower curved surface corresponding to 30 to 180 degrees of the circumference of the vessel and extending substantially the length of the vessel formed by a perforated plate having a multiplicity of holes spaced at intervals in the range of from 0.5 to 50 mm, through said plate from an olefin feed chamber mounted below and covering the plate. A polymer catalyst is fed into the horizontal cylindrical vessel through a polymerization catalyst inlet port located in a portion of the vessel other than the lower curved surface formed by the perforated plate. The olefin is reacted in the presence of a catalyst with agitation to form polymer. Unreacted olefin is removed through a discharge port located in a portion of the vessel other than the lower curved surface formed by the perforated plate. Polymer is removed through an outlet port located in a portion of the vessel other than the lower curved surface formed by the perforated plate.

7 Claims, 3 Drawing Figures

METHOD FOR VAPOR PHASE POLYMERIZATION OF OLEFINS

This is a division, of application Ser. No. 242,308, filed Mar. 10, 1981 now U.S. Pat. No. 4,372,919.

BACKGROUND OF THE INVENTION

This invention relates to a method for vapor phase polymerization of olefins.

The vapor phase polymerization method has recently come to attract attention as a polymerization method for olefins. However, in the case of using known vapor phase polymerization methods it is difficult to avoid problems peculiar to vapor phase polymerization such as, for example, the production of hot spots, and high quality polymers have not been produced yet stably and economically. Conventional vapor phase polymerization methods use apparatus which are broadly classified into longitudinal fluidized bed type and horizontal agitation bed type, but the former easily allows popcorn-, flake- or block-like polymers to be produced according to particular kinds of catalysts, and the polymerization heat is removed by recycle of gas components, but this gas circulation is said to require a considerable cost. Known as the latter type are, for example, those disclosed in Japanese Patent Publication No. 2019/1970 and Patent Laying Open Print No. 86584/1976, but with those apparatus it is difficult to completely suppress the formation of hot spots and to prevent the production of block-like polymers, and a large power is required for agitation.

SUMMARY OF THE INVENTION

It is an object of this invention to improve horizontal agitation bed type vapor phase polymerization of olefins.

It is another object of this invention to provide a polymerization method in which it is difficult to form hot spots during polymerization so being capable of suppressing the production of block-like polymers, requiring reduced power for agitation and being capable of producing polymers having a suitable particle size distribution economically and stably.

Other objects and advantages of this invention will become apparent from the following description.

The foregoing objects of this invention can be attained by utilizing a vapor phase polymerization apparatus for olefins comprising a horizontal hollow cylindrical vessel having a lower curved surface which is constructed by a perforated plate, one or more agitator vanes on a driving shaft centrally located in said vessel, an olefin feed chamber mounted so as to cover from below said perforated plate and adapted to feed an olefin gas through said perforated plate, a polymerization catalyst inlet port, a polymer outlet port and an unreacted olefin gas discharge port, which ports are all provided in other portions than the curved perforated portion of said vessel. It is preferable that a gas flow velocity reducing chamber be provided at the top of the aforesaid horizontal hollow cylindrical vessel and that to the said gas flowing velocity reducing chamber be attached the unreacted olefin gas discharge port for discharge and recycle of unreacted olefin gas.

In the vapor phase polymerization apparatus of this invention it is one feature to use a curved perforated plate. Even if a perforated plate is used, if it is a flat perforated plate, the agitation becomes non-uniform because of formation of dead space resulting in a local temperature rise and melting or flocculation and coagulation of the resulting layer, which impedes continuous operation. These drawbacks can be overcome by using the curved perforated plate of this invention. The second feature of the vapor phase polymerization apparatus of this invention is that a gas flow velocity reducing chamber is provided at the top of the reaction vessel. In a horizontal agitation bed type vapor phase polymerization vessel as in this invention, the agitation revolution and the gas flow velocity should be raised so as to allow powder within the reaction vessel to spread throughout the vessel, which is desirable in point of volume efficiency and uniformity of the quality of the resulting polymer. However, when the polymerization vessel is operated so that the powder circulates throughout the reaction vessel, fine particles are more likely to be scattered along with unreacted olefin gas, which causes a serious problem in point of operation of the apparatus. The gas flow velocity reducing chamber provided in this invention prevents such scatter of fine particles in an effective manner and permits a stable production of a high quality polymer.

BRIEF DESCRIPTION OF THE INVENTION

DETAILED DESCRIPTION OF THE INVENTION

Figure 1:
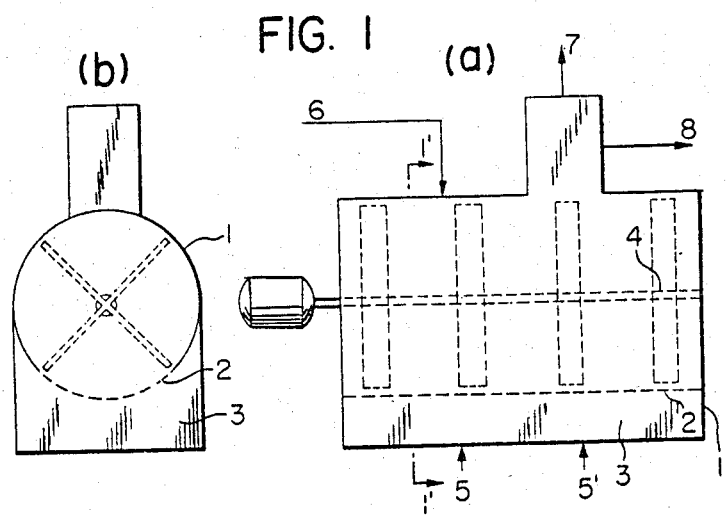
FIGS. 1 and 2 are each a schematic sectional view of a vapor phase polymerization apparatus for olefins embodying the invention, in which (a) is a longitudinal section and (b) is a transverse section taken on line 1'—1' of (a).
Figure 2:
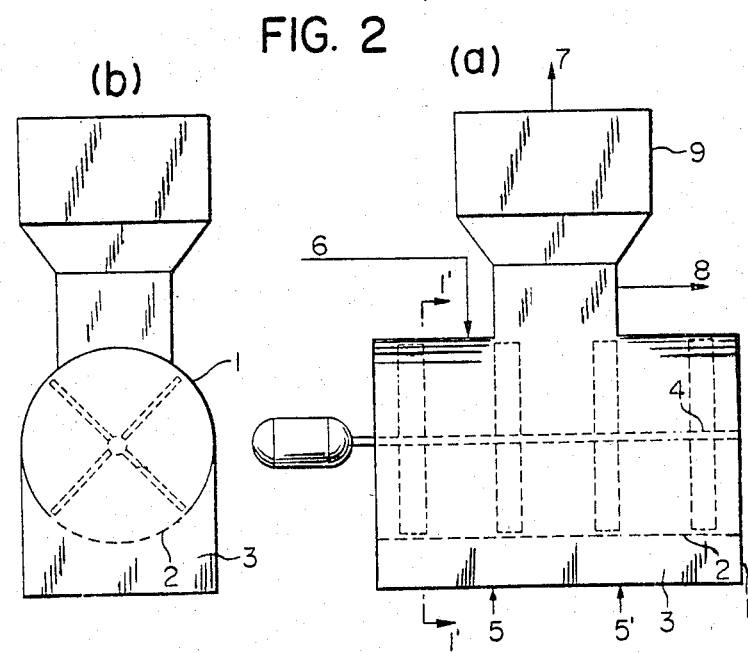
Figure 3:
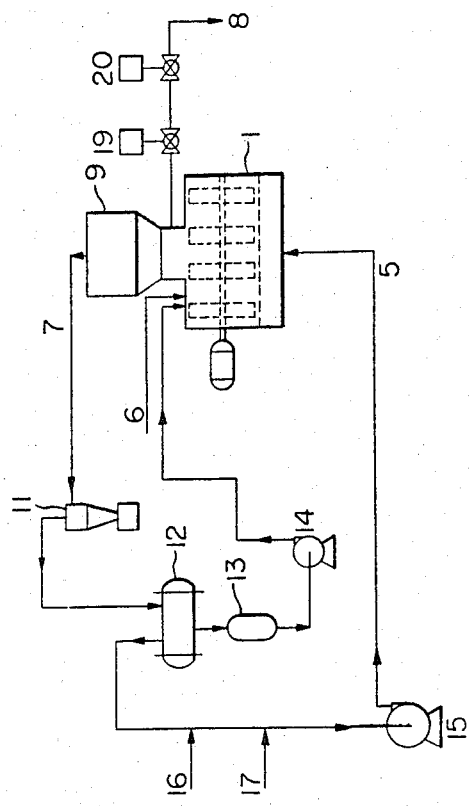
FIG. 3 is a schematic flow sheet showing an example of olefin polymerization using the apparatus of this invention.

This invention is here described with reference to the accompanying drawings. As illustrated in FIGS. 1 and 2, the reaction vessel body in the apparatus of this invention consists of a vessel 1 having a horizontal hollow cylindrical structure. The ratio of length to diameter of the vertical section within the hollow cylinder is not specially limited, but usually it ranges from 0.5 to 10, preferably from 1 to 5.

As previously described, one of the features of the apparatus of this invention resides in that the lower curved surface of the cylindrical vessel 1 is constituted by a perforated plate 2 and that an olefin feed chamber 3 the top portion of which is constructed by the said perforated plate is provided below the latter to feed an olefin gas through the perforated plate. The portion where such perforated plate is provided corresponds to the curved portion extending about the bottom of the cylinder. It is preferable that the curved surface corresponding to 30 to 180, particularly 60 to 120, degrees in terms of angle from the center of the cylinder be perforated. The hole diameter of the perforated plate usually ranges from 0.5 to 5 mm, preferably from 1 to 2 mm. The hole spacing, which differs according to the size and shape of hole, usually ranges from 0.5 to 50 mm, preferably from 3 to 30 mm. The shape of hole of the perforated plate is not limited to a circle, it may take any other shape, including square and flat. It may be split- or wire gauze-like. Thus the holes of the perforated plate in the apparatus of this invention include a slit or the like corresponding to a continuous linear body from hole to hole commonly used. In other words, the perforated plate used in the invention has a multitude of uniformly dispersed through spaces corresponding to hole at least in one width thereof, preferably almost throughout its longitudinal direction. It may be provided at the lower portion of the cylinder at substantially the same curvature as that of the cylinder. As the material of the perforated plate there may be used stainless steel or other metal plate subjected to perforation, sintered metal, wire gauze, or the like. Of course, the perforated plate may be formed of the same material as the upper portion of the cylinder. The olefin feed chamber 3, which is provided so as to cover from below the perforated plate, may take any shape if only it has the function of feeding olefin gas uniformly into the reaction zone through the perforated plate. The olefin is introduced into the olefin feed chamber through pipe 5 or 5'.

The second feature of the apparatus of this invention, as illustrated in FIG. 2, resides in that a gas flow velocity reducing chamber 9 is provided at the top of the cylindrical vessel 1 and that an olefin gas discharge portion 7 is attached preferably to the top of the gas flow velocity reducing chamber 9 in order to discharge and recycle unreacted olefin gas therethrough. The gas flow velocity reducing chamber may take any shape, for example, it may be an inverted truncated cone or such a hopper shape as illustrated, but preferably it has a portion whose sectional area is larger than that of the connection with the hollow cylinder as the reaction vessel body. It is preferable that the volume of the gas flow velocity reducing chamber be 0.5 to 3 times the volume of the hollow cylinder and that the sectional area of the connection with the hollow cylinder be 0.4 to 1 times the vertical sectional area of the hollow cylinder. However, these numerical ranges do not constitute limitations. The gas flow velocity reducing chamber may be provided in plural numbers for one reaction vessel.

Numeral 4 designates agitator means which has a driving shaft in the longitudinal center of the cylinder and which is provided with one or more stirring vanes. As the stirring vane there may be used paddle type, inclined paddle type, spiral type, or a vane provided with a scraper for scraping the internal wall of the polymerization apparatus. One or more, for example 2 to 6, stirring vanes are mounted on the driving shaft.

Numerals 6 and 8 designate a polymerization catalyst introducing pipe and a polymer outlet port, respectively, which may both be mounted in any positions other than the portion of the perforated plate in the polymerization apparatus. But, as illustrated in the drawing, the polymerization catalyst inlet port 6 and the unreacted olefin gas discharge port 7 usually are provided at the top of the cylindrical vessel. The polymer outlet port usually is provided either at the top or at a side portion. The apparatus of this invention may be provided with a hydrogen inlet port if required. The hydrogen inlet port may be provided independently, or alternatively the olefin feed chamber or the catalyst inlet port may serve as a hydrogen feed chamber or a hydrogen inlet port. Particularly, it is a preferred mode of embodiment to feed hydrogen through the perforated plate from the olefin feed chamber. The feed of hydrogen to the olefin feed chamber is effected through a similar pipe to the olefin introducing pipe. There also may be provided a cooling liquid inlet port for control of the polymerization temperature, which port may be provided independently; or alternatively, the cooling liquid may be fed through the catalyst inlet port. It is particularly preferred that such cooling liquid be sprayed from the top of the cylindrical vessel. There may be provided a partition plate within the reaction vessel, or the olefin feed chamber may be divided in plural compartments. These modifications are included in this invention.

FIG. 2 is a schematic flow sheet showing an example of olefin polymerization using the apparatus of the invention.

Catalyst is fed usually as a slurry of saturated hydrocarbon or as a solid. In this case, a promotor may be added simultaneously or separately. It is preferable to feed hydrogen or nitrogen gas in order to prevent the catalyst inlet port from being blocked. The olefin is fed as a gas into the reaction vessel body continuously through the perforated plate from the olefin feed chamber. In this case, hydrogen is also fed if required. The resulting polymer which has overflown from the reaction vessel body is successively taken out of the polymerization system through the polymer outlet port 8; it may be withdrawn in an intermittent manner by an intermittent switching of ball valves 19 and 20. Gases, including unreacted olefin gas, go through a cyclone or filter 11 to remove solids, then through a condenser 12 to liquefy and separate the cooling liquid, thereafter it is conveyed through the pipe 5 by means of a gas recycle blower 15 and is fed again to the reaction vessel body through the olefin feed chamber. The separated cooling liquid is once stored in a tank 13 and then fed again to the reaction vessel body by means of a pump 14. To make up for olefin and hydrogen consumed in the reaction, there are fed olefin and hydrogen through pipes 16 and 17, respectively. The apparatus of this invention may be coupled in plural numbers in the execution of vapor phase polymerization of olefin. Examples of the olefin gas are α-olefins having not more than 12 carbon atoms, such as ethylene, propylene, butene-1, hexene-1 and 4-methylpentene-1, each alone or as a mixture of two or more. The olefin as exemplified above may be copolymerized with a diene such as butadiene, 1,4-hexadiene or ethylidene norbornene. It is fed to the recycle system with or without hydrogen; in this case, the recycle gas composition may be suitably selected according to the object polymer.

The reaction vessel is held at a temperature ranging from 0° to 125° C., preferably from 20° to 100° C., and at a pressure ranging from atmospheric pressure to 70 kg/cm$^2$.G, preferably from 2 to 60 kg/cm$^2$.G. The agitator means is operated at revolutions of 10 to 500 r.p.m., preferably 20 to 300 r.p.m. The recycle gas linear velocity within the reaction vessel is 0.5 to 25 cm/sec, preferably 1 to 10 cm/sec, based on sectional area.

As the catalyst there may be used known Ziegler, Phillips and Standard type catalysts which are commonly used in the preparation of polyolefins.

In the case where the vapor phase polymerization of olefin is carried out using the apparatus of this invention, the powder within the polymerization system becomes fluidized uniformly and to a suitable extent, resulting in that the agitation torque required can be reduced and particularly the agitator means can be started extremely easily. Furthermore, the formation of hot spots can be suppressed more easily by the synergistic effect between fluidization and agitation, thus affording a polymer having a suitable particle size distribution free from incorporation of block-like polymer or the like. It is possible to obtain a high quality polymer stably and efficiently while preventing the powder from being scattered. Moreover, the removal of polymerization heat is very easy since the fluidization can be attained with a low temperature gas, but if required there also may be effected the removal of polymerization heat utilizing the evaporation heat of butane or other cooling liquid.

Working examples of this invention are given below to further illustrate the invention, but it is to be understood that the invention is not limited thereto.

EXAMPLE 1

1 kg. of anhydrous magnesium chloride, 50 g. of 1,2-dichloroethane and 170 g. of titanium tetrachloride were ball-milled for 16 hours at room temperature under a nitrogen atmosphere to allow the titanium compound to be attached to the carrier. The solid substance thereby obtained contained 35 mg. of titanium per gram thereof.

There was used such a horizontal agitation-fluidized bed type 3 liter reaction vessel as illustrated in FIG. 1, and gases were recycled through a loop consisting of a cyclone, a condenser, a blower and a flow rate adjuster. The temperature of the reaction vessel was adjusted by flowing warm water in the jacket.

700 g. of dry polyethylene powder was placed in the reaction vessel and the temperature adjusted to 85° C. in advance, into which a catalyst slurry consisting of 280 mg. of the solid substance obtained above and 8.0 mmol of triethylaluminum both dispersed in 1 l hexane was fed through line 6 at a rate of 250 ml/hr, while through lines 16 and 17 were fed hydrogen and ethylene respectively while adjusting so that the hydrogen/ethylene ratio (mole ratio) in the gas phase was 1.0. Further the gases within the polymerization system were recycled at a rate of 6 $m^3$/hr by means of the blower. Paddle type stirring vanes were mounted in the reaction vessel, and polymerization was made with stirring at 150 r.p.m. and at a total pressure of 9 kg/$cm^2$.G. The resulting polymer was withdrawn at suitable times during the polymerization, and in 28 hours the polymerization was completed in the normal manner, to yield 5.6 kg. of white polyethylene (except that polyethylene initially fed to the reaction vessel) having a melt index of 4.6, a density of 0.962 and a bulk density of 0.42.

The reaction vessel was then opened and checked to find that there was no polymer adhesion therein.

EXAMPLE 2

There was used such a horizontal agitation-fluidized bed type 3 liter reaction vessel as illustrated in FIG. 1, and a gases were recycled through a loop consisting of a cyclone, a condenser, a blower and a flow rate adjuster. The temperature of the reaction vessel was adjusted by flowing warm water in the jacket.

700 g. of dry polyethylene powder were placed in the reaction vessel and the temperature adjusted to 80° C. in advance, into which a catalyst slurry consisting of 70 mg. of the solid substance obtained in Example 1 and 4.5 mmol of triethylaluminum both dispersed in 1 l hexane was fed through line 6 at a rate of 300 ml/hr, while through lines 16 and 17 were fed hydrogen and an ethylene/butene-1 mixture respectively while adjusting so that the hydrogen/ethylene and butene-1/ethylene ratios (mole ratios) in the gas phase were 0.3 and 0.22 respectively. Further the gases within the polymerization system were recycled at a rate of 5 $m^3$/hr by means of the blower. Paddle type stirring vanes were mounted in the reaction vessel, and polymerization was made with stirring at 150 r.p.m. and at a total pressure of 8 kg/$cm^2$.G. The resulting polymer was withdrawn at suitable times during the polymerization, and in 30 hours the polymerization was completed in the normal manner, to yield 6.2 kg. of white polyethylene (except the polyethylene initially fed to the reaction vessel) having a melt index of 1.1, a density of 0.925 and a bulk density of 0.37.

The reaction vessel was then opened and checked to find that there was no polymer adhesion therein.

EXAMPLE 3

There was used such a horizontal agitation-fluidized bed type 3 liter reaction vessel as illustrated in FIG. 1, and gases were recycled through a loop consisting of a cyclone, a condenser, a blower and a flow rate adjuster. The temperature of the reaction vessel was adjusted by flowing warm water in the jacket.

700 g. of dry polyethylene powder were placed in the reaction vessel and the temperature adjusted to 80° C. in advance, into which a catalyst slurry consisting of 60 mg. of the solid substance obtained in Example 1 and 3.0 mmol of triethylaluminum both dispersed in 1 l hexane was fed through line 6 at a rate of 300 ml/hr, while through lines 16 and 17 were fed hydrogen and an ethylene-propylene mixture while adjusting so that the hydrogen/ethylene and propylene/ethylene ratios (mole ratios) in the gas phase were 0.29 and 0.21 respectively. Further the gases within the polymerization system were recycled by means of the blower. Paddle type stirring vanes were mounted in the reaction vessel, and polymerization was made with stirring at 150 r.p.m. and at a total pressure of 9 kg/$cm^2$.G. The resulting polymer was withdrawn at suitable times during the polymerization, and in 25 hours the polymerization was completed in the normal manner, to yield 5.3 kg. of white polyethylene (except the polyethylene initially fed to the reaction vessel) having a melt index of 1.0, a density of 0.930 and a bulk density of 0.36.

The reaction vessel was then opened and checked to find that there was no polymer adhesion therein.

EXAMPLE 4

There was used such a horizontal agitation-fluidized bed type 3 liter reaction vessel as illustrated in FIG. 1, and gases were recycled through a loop consisting of a cyclone, a condenser, a blower and a flow rate adjuster. The temperature of the reaction vessel was adjusted by flowing warm water in the jacket.

700 g. of dry polypropylene powder was charged into the reaction vessel and the temperature adjusted to 65° C. in advance, into which a catalyst slurry consisting of 280 mg. of the solid substance obtained in Example 1 and a mixture of 8.0 mmol triethylaluminum and 2.0 mmol ethyl benzoate, both dispersed in 1 l hexane, was fed through line 6 at a rate of 1 l/hr, while propylene was fed through line 17, and the gases within the polymerization system were recycled at a rate of 6 $m^3$/hr by means of the blower. Paddle type stirring vanes were mounted in the reaction vessel, and polymerization was made with stirring at 150 r.p.m. and at a total pressure of 9 kg/$cm^2$.G. The resulting polymer was withdrawn at suitable times during the polymerization, and in 28 hours the polymerization was completed in the normal manner, to yield 5.1 kg. of white polypropylene (except the polypropylene initially fed to the reaction vessel) having a melt index of 0.15, a density of 0.910 and a bulk density of 0.44.

The reaction vessel was then opened and checked to find that there was no polymer adhesion therein.

EXAMPLE 5

1 kg. of anhydrous magnesium chloride, 50 g. of 1,2-dichloroethane and 170 g. of titanium tetrachloride were ball-milled for 16 hours at room temperature under a nitrogen atmosphere to allow the titanium compound to be attached to the carrier. The solid substance thereby obtained contained 35 mg. of titanium per gram thereof.

There was used such a horizontal agitation-fluidized bed type 3 liter reaction vessel as illustrated in FIG. 2, and gases were recycled through a loop consisting of a cyclone, a condenser, a blower and a flow rate adjuster. The temperature of the reaction vessel was adjusted by flowing warm water in the jacket.

700 g. of dry polyethylene powder were placed in the reaction vessel and the temperature adjusted to 85° C. in advance, into which a catalyst slurry consisting of 280 mg. of the solid substance obtained above and 8.0 mmol of triethylaluminum both dispersed in 1 l hexane was fed through line 6 at a rate of 250 ml/hr, while through lines 16 and 17 were fed hydrogen and ethylene respectively while adjusting so that the hydrogen/ethylene ratio (mole ratio) in the gas phase was 1.2. Further the gases within the polymerization system were recycled at a rate of 6 m$^3$/hr by means of the blower. Paddle type stirring vanes were mounted in the reaction vessel, and polymerization was made with stirring at 150 r.p.m. and at a total pressure of 9 kg/cm$^2$.G. The resulting polymer was withdrawn at suitable times during the polymerization, and in 28 hours the polymerization was completed in the normal manner, to yield 5.1 kg. of white polyethylene (except the polyethylene initially fed to the reaction vessel) having a melt index of 8.1, a density of 0.963 and a bulk density of 0.43.

The reaction vessel was then opened and checked to find that there was no polymer adhesion therein.

EXAMPLE 6

There was used such a horizontal agitation-fluidized bed type 3 liter reaction vessel as illustrated in FIG. 2, and gases were recycled through a loop consisting of a cyclone, a condenser, a blower and a flow rate adjuster. The temperature of the reaction vessel was adjusted by flowing warm water in the jacket.

700 g. of dry polyethylene powder were placed in the reaction vessel and the temperature adjusted to 80° C. in advance, into which a catalyst slurry consisting of 70 mg. of the solid substance obtained in Example 1 and 4.5 mmol of triethylaluminum dispersed in 1 l hexane was fed through line 6 at a rate of 300 ml/hr, while through lines 16 and 17 were fed hydrogen and an ethylene/butene-1 mixture respectively while adjusting so that the hydrogen/ethylene and butene-1/ethylene ratios (mole ratios) in the gas phase were 0.27 and 0.28 respectively, further the gases within the polymerization system were recycled at a rate of 5 m$^3$/hr by means of the blower. Paddle type stirring vanes were mounted in the reaction vessel, and polymerization was made with stirring at 150 r.p.m. and at a total pressure of 8 kg/cm$^2$.G. The resulting polymer was withdrawn at suitable times during the polymerization, and in 30 hours the polymerization was completed in the normal manner, to yield 6.2 kg. of white polyethylene (except the polyethylene initially fed to the reaction vessel) having a melt index of 1.8, a density of 0.921 and a bulk density of 0.39.

The reaction vessel was then opened and checked to find that there was no polymer adhesion therein.

EXAMPLE 7

There was used such a horizontal agitation-fluidized bed type 3 liter reaction vessel as illustrated in FIG. 2, and gases were recycled through a loop consisting of a cyclone, a condenser, a blower and a flow rate adjuster. The temperature of the reaction vessel was adjusted by flowing warm water in the jacket.

700 g. of dry polyethylene powder were placed in the reaction vessel and the temperature adjusted to 80° C. in advance, into which a catalyst slurry consisting of 60 mg. of the solid substance obtained in Example 1 and 3.0 mmol of triethylaluminum both dispersed in 1 l hexane was fed through line 6 at a rate of 300 ml/hr, while through lines 16 and 17 were fed hydrogen and an ethylene-propylene mixture while adjusting so that the hydrogen/ethylene and propylene/ethylene ratios (mole ratios) in the gas phase were 0.36 and 0.19 respectively. Further the gases within the polymerization system were recycled by means of the blower. Paddle type stirring vanes were mounted in the reaction vessel, and polymerization was made with stirring at 150 r.p.m. and at a total pressure of 9 kg/cm$^2$.G. The resulting polymer was withdrawn at suitable times during the polymerization, and in 28 hours the polymerization was completed in the normal manner, to yield 5.3 kg. of white polyethylene (except the polyethylene initially fed to the reaction vessel) having a melt index of 1.5, a density of 0.932 and a bulk density of 0.38.

The reaction vessel was then opened and checked to find that there was no polymer adhesion therein.

EXAMPLE 8

There was used such a horizontal agitation-fluidized bed type 3 liter reaction vessel as illustrated in FIG. 2, and gases were recycled through a loop consisting of a cyclone, a condenser, a blower and a flow rate adjuster. The temperature of the reaction vessel was adjusted by flowing warm water in the jacket.

700 g. of dry polypropylene powder were charged into the reaction vessel and the temperature adjusted to 65° C. in advance, into which a catalyst slurry consisting of 280 mg. of the solid substance obtained in Example 1 and a mixture of 8.0 mmol triethylaluminum and 2.0 mmol ethyl benzoate, both dispersed in 1 l hexane, was fed through line 6 at a rate of 1 l/hr, while propylene was fed through line 17, and the gases within the polymerization system were recycled at a rate of 6 m$^3$/hr by means of the blower. Paddle type stirring vanes were mounted in the reaction vessel, and polymerization was made with stirring at 150 r.p.m. and at a total pressure of 9 kg/cm$^2$.G. The resulting polymer was withdrawn at suitable times during the polymerization, and in 28 hours the polymerization was completed in the normal manner, to yield 6.0 kg. of white polypropylene (except the polypropylene initially fed to the reaction vessel) having a melt index of 0.22, a density of 0.910 and a bulk density of 0.44.

The reaction vessel was then opened and checked to find that there was no polymer adhesion therein.

We claim:

1. A method for vapor phase polymerization of olefins which comprises:
   feeding an olefin gas into a horizontal cylindrical vessel, having a lower curved surface formed by a perforated plate which is an arc of a circle defined by an angle of from 30 to 180 degrees from the center of said cylindrical vessel, said plate extending substantially the length of said vessel and having a multiplicity of holes which have a diameter in the range of from 0.5 to 5 mm spaced at intervals in the range of from 0.5 to 50 mm, through said plate from an olefin feed chamber mounted below and covering said plate;

feeding a polymer catalyst into said horizontal cylindrical vessel through a polymerization inlet port located in a portion of said vessel other than said lower curved surface formed by said perforated plate;

reacting said olefin in the presence of said catalyst with agitation to form polymer;

removing unreacted olefin through an unreacted olefin discharge port located in a portion of said vessel other than said lower curved surface formed by said perforated plate; and removing said polymer through a polymer outlet port located in a portion of said vessel other than said lower curved surface formed by said perforated plate.

2. A method for vapor phase polymerization of olefins which comprises:

feeding an olefin gas into a horizontal cylindrical vessel, having a lower curved surface formed by a perforated plate which is an arc of a circle defined by an angle of from 30 to 180 degrees from the center of said cylindrical vessel, said plate extending substantially the length of said vessel and having a multiplicity of holes which have a diameter in the range of from 0.5 to 5 mm spaced at intervals in the range of from 0.5 to 50 mm, through said plate from an olefin feed chamber mounted below and covering said plate;

feeding a polymer catalyst into said horizontal cylindrical vessel through a polymerization catalyst inlet port located in a portion of said vessel other than said lower curved surface formed by said perforated plate;

reacting said olefin in the presence of said catalyst with agitation to form polymer;

reducing the velocity of unreacted olefin gas in a gas flow velocity reducing chamber mounted at the top of said vessel;

discharging said unreacted olefin gas through an olefin gas discharge port located in said gas flow velocity reducing chamber distant said vessel;

recycling said discharged unreacted olefin gas to said olefin feed chamber; and removing said polymer through a polymer outlet port located in a portion of said vessel other than said lower curved surface formed by said perforated plate.

3. The method as defined in claim 1 or 2 wherein the diameter of the holes in said perforated plate is in the range of from 1 to 2 mm.

4. The method as defined in claim 2 wherein the volume of said gas flow velocity reducing chamber is 0.5 to 3 times the volume of said horizontal cylindrical vessel.

5. The method as defined in claim 2 wherein the cross sectional area of the connection part between said gas flow velocity reducing chamber and said horizontal cylindrical vessel is 0.4 to 1 times the vertical sectional area of said horizontal cylindrical vessel.

6. The method as defined in claim 2 wherein said gas flow velocity reducing chamber has a portion having a cross sectional area larger than that of said connection part between said gas flow velocity reducing chamber and said horizontal cylindrical vessel.

7. The method as defined in claim 1 or 2 wherein said olefin is an α-olefin having from 2 to 12 carbon atoms.

* * * * *